United States Patent
Leenaerts

(10) Patent No.: US 6,999,745 B2
(45) Date of Patent: Feb. 14, 2006

(54) MIXER WITH A VARIABLE GAIN CURRENT-TO-VOLTAGE CONVERTER

(75) Inventor: Dominicus Martinus Wilhelmus Leenaerts, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 497 days.

(21) Appl. No.: 10/266,298

(22) Filed: Oct. 8, 2002

(65) Prior Publication Data

US 2003/0087624 A1 May 8, 2003

(30) Foreign Application Priority Data

Oct. 11, 2001 (EP) .............................. 01203858

(51) Int. Cl.
*H04B 1/26* (2006.01)
*H04B 1/28* (2006.01)
*H03D 3/00* (2006.01)
*H02M 11/00* (2006.01)

(52) U.S. Cl. ...................... 455/313; 455/323; 455/326; 455/333; 327/102; 327/103

(58) Field of Classification Search ................ 455/313, 455/323–326, 332, 333, 334, 337, 341, 232.1, 455/131, 118; 327/102, 103, 113, 359, 560; 330/254

See application file for complete search history.

(56) References Cited

U.S. PATENT DOCUMENTS

| | | | | |
|---|---|---|---|---|
| 5,007,038 A | * | 4/1991 | Nakane et al. ........... | 369/44.11 |
| 5,151,625 A | * | 9/1992 | Zarabadi et al. .......... | 327/103 |
| 5,392,268 A | * | 2/1995 | Rokutan .................. | 369/53.31 |
| 5,418,494 A | * | 5/1995 | Betti et al. .............. | 330/254 |
| 5,642,071 A | * | 6/1997 | Sevenhans et al. ........ | 327/359 |
| 5,939,917 A | * | 8/1999 | Debaty .................... | 327/246 |
| 6,021,323 A | | 2/2000 | Vagher .................... | 455/324 |
| 6,029,060 A | * | 2/2000 | Ashby ..................... | 455/326 |
| 6,084,466 A | * | 7/2000 | Phanse et al. ............ | 327/560 |
| 6,121,818 A | * | 9/2000 | Kim et al. ................ | 327/359 |
| 6,657,494 B1 | * | 12/2003 | Twomey ................... | 330/254 |
| 2002/0039052 A1 | | 4/2002 | Straub et al. ............ | 331/45 |

FOREIGN PATENT DOCUMENTS

WO WO0137436 5/2001

\* cited by examiner

*Primary Examiner*—Duc M. Nguyen
(74) *Attorney, Agent, or Firm*—Adam L. Stroud

(57) ABSTRACT

A receiver comprising an input for receiving a first signal, said receiver further comprising a local oscillator for generating a periodical signal. The receiver further comprises a mixer for generating a third signal representative for a combination of a second signal and the periodical signal. The receiver is characterized in that it further comprises a voltage to current converter for receiving the first signal and generating the second signal as a current indicative for the first signal. The mixer comprises a plurality of controllable switches. The receiver further comprises a variable gain current to voltage converter (VGIV) coupled to the passive mixer, the VGIV receiving the third signal and generating a first voltage signal, said first voltage signal being in a linear relationship with the third signal.

10 Claims, 2 Drawing Sheets

MIXER WITH A VARIABLE GAIN CURRENT-TO-VOLTAGE CONVERTER

Figure 1:
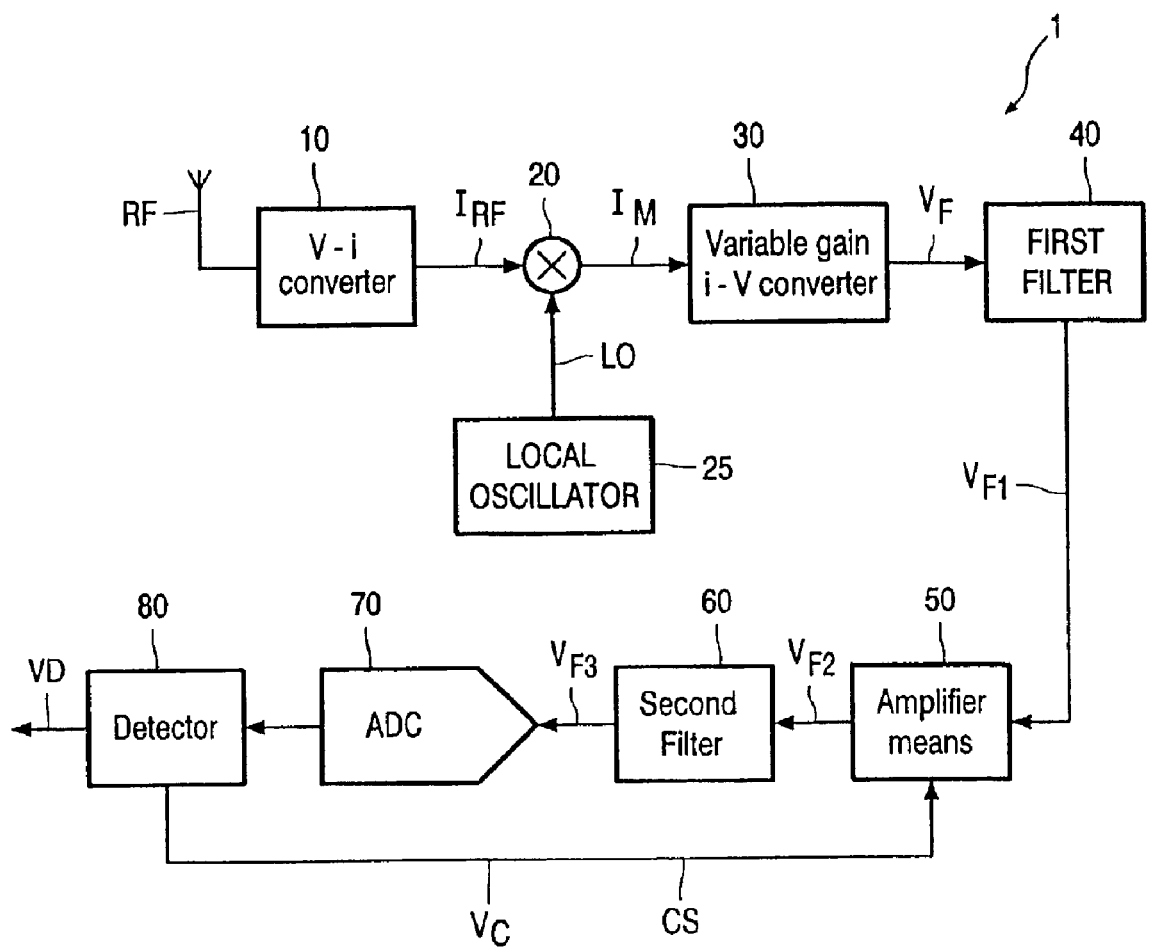

The invention relates to a receiver including an input for receiving a first signal, a local oscillator for generating a periodical signal, and a mixer for generating a third signal representative for a combination of a second signal and the periodical signal.

Such receivers are widely used devices in communications. Their use covers a wide range such as digital or analog communications either via a wired or a wireless channel. Furthermore, depending on a carrier frequency of an input signal, the internal architecture of the receivers could differ substantially from each other. When the carrier frequency is very high, i.e. as high as tens of GHz, usually a first down-conversion is applied, resulting in a lower frequency signal. Said down-conversion is achieved in a first mixer where a first periodical signal generated by a first local oscillator is combined with the input signal, said input signal being previously amplified. The first mixer generates a first intermediate frequency (IF) signal that is further applied to a second mixer for a second down conversion. The second mixer combines the first IF signal with a second periodical signal generated by a second local oscillator and generates a second IF signal. The second IF signal is usually a Zero-IF or a Low-IF signal. It should be pointed out here that the power consumption in such known receivers is relatively high because they use two oscillators and two mixers and their main gain is obtained in high frequency domain.

Another possibility of obtaining the IF signal is directly down-converting the high frequency input signal into a Zero-IF or Low-IF signal using only one mixer, usually a quadrature one, and one local oscillator, normally a quadrature one.

Such an architecture is known from WO-01/37436 A2. In this patent application a receiver architecture is presented. Said receiver operates on Zero-IF or Low-IF signals, i.e. on the signal obtained after a down-conversion of the input signal. The IF signal is filtered and amplified in a series connection of complex filters coupled to controllable amplifiers. This application focuses on reducing power consumption after down-conversion of the input signal. It is noted that the high frequency input signal could be directly applied to a mixer only if the input of the mixer is adapted to the input signal. For example if the mixer has a relatively high input impedance then the input signal should be a voltage and if the mixer has a relatively low input impedance then the input signal should a current. Furthermore, it is useful to reduce power consumption wherever this is possible and maintaining in the same time all main technical features of the receiver.

It is therefore an object of the present invention to provide a receiver having a relatively low power consumption.

In accordance with the invention this is achieved in a receiver including an input for receiving a first signal, a local oscillator for generating a periodical signal, and a mixer for generating a third signal representative for a combination of a second signal and the periodical signal (LO), being characterized in that the receiver further comprise a voltage to current converter for receiving the first signal and generating the second signal as a current indicative for the first signal,
the mixer comprises a plurality of controllable switches,
the receiver further comprises a variable gain current to voltage converter coupled to the passive mixer, the variable gain current to voltage converter receiving the third signal and generating a first voltage signal, said bat voltage signal being in a linear relationship with the third signal.

Usually the first signal received by the receiver is a voltage signal within a relatively high frequency range, e.g. tens of GHz. The receiver comprises a voltage to current converter that receives the first input signal and generates a second signal which is a current and, said current being indicative for the first signal. The voltage to current converter provides a relatively high input impedance in order to adapt to the first signal. When more receivers are coupled to a same generator providing the first signal, the receivers having a relatively high input impedance so that they do not load the generator too much. This allows more receivers to be coupled to the same generator. The voltage to current converter generates a second signal that is proportional to the first signal, said voltage to current converter having no power gain. The second current signal is further inputted to a mixer for combining with the periodical signal, said mixer generating a third signal. Considering that the first signal has a first frequency and the periodical signal has a second frequency then the third signal is indicative for a difference between the first frequency and the second frequency. Preferably the difference between the first frequency and the second frequency approaches zero, i.e. there is a Zero-IF receiver. In order to reduce the power consumption of the receiver, the mixer is passive i.e. it comprises passive switches. A passive switch is considered to be a switch whose power consumption either in an ON state i.e. when a signal passes through it or in an OFF state i.e. when a signal does not pass through it is significantly zero. In an embodiment of the invention CMOS transistors are applied as passive switches. The variable gain current to voltage converter converts and amplifies the third signal and generates a first voltage signal. Because the third signal comprises only relatively low frequency signals the amplification is easier to be obtained. In an embodiment of the receiver, a pair of resistors determines the amplification of the variable gain current to voltage converter. The resistors values could be controlled by either an electrical signal e.g. as a voltage signal or a current signal or by a non-electrical signal e.g. a temperature or a light signal.

The following aspects are observed:
the voltage to current converter could be realized in an active form as a transconductance amplifier or in a passive form, with a simple resistor,
when it is used in a network, the receiver uses as local oscillator a quadrature oscillator that generates a periodical signal having two components, i.e. a first component I and a second component Q that are in quadrature, each of the components having a highest level and a lowest level,
the variable gain current to voltage converter could be a transimpedance amplifier.

The first voltage signal generated by the variable gain current to voltage converter is further low-pass filtered in a first filter in order to reduce high frequency parasitic components comprised in the first voltage signal. In order to maintain power consumption at a low level, the first filter is a passive one. When power consumption is not critical the first filter could also be an active filter. In other applications the first filter could be a capacitor that could be integrated on the same chip with the variable gain current to voltage converter. The first filter generates a second voltage signal that is inputted to an amplifier means. The amplifier means generates a third voltage signal that is inputted to a second filter, said second filter removing adjacent channels and image frequencies comprised in the first voltage signal. As it was previously mentioned, in order to maintain low power consumption, the second filter is also passive but depending on the application it could be active, i.e. in applications where power consumption is not an important parameter. The signal generated by the second filter is inputted into an analog to digital converter for obtaining a binary signal that is demodulated in a detector. The detector is coupled to the analog to digital converter and generates a demodulated signal and a control signal. The amplifier means compensates losses in the first filter and the second filter and, furthermore it is controlled by the control signal generated by the demodulator in order to maintain a significantly constant level of the demodulated signal. It is further observed that using Zero-IF, the analog to digital converter can have a bandwidth that is substantially half the bandwidth required when Low-IF is used.

Figure 3:
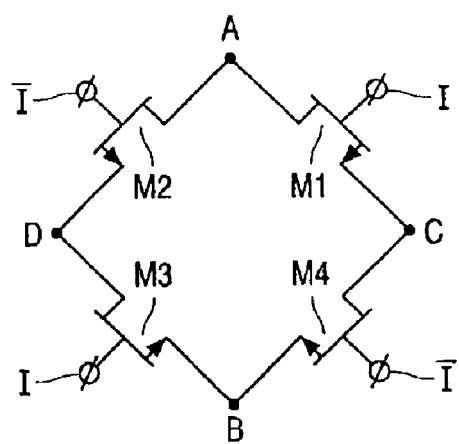
Figure 2:
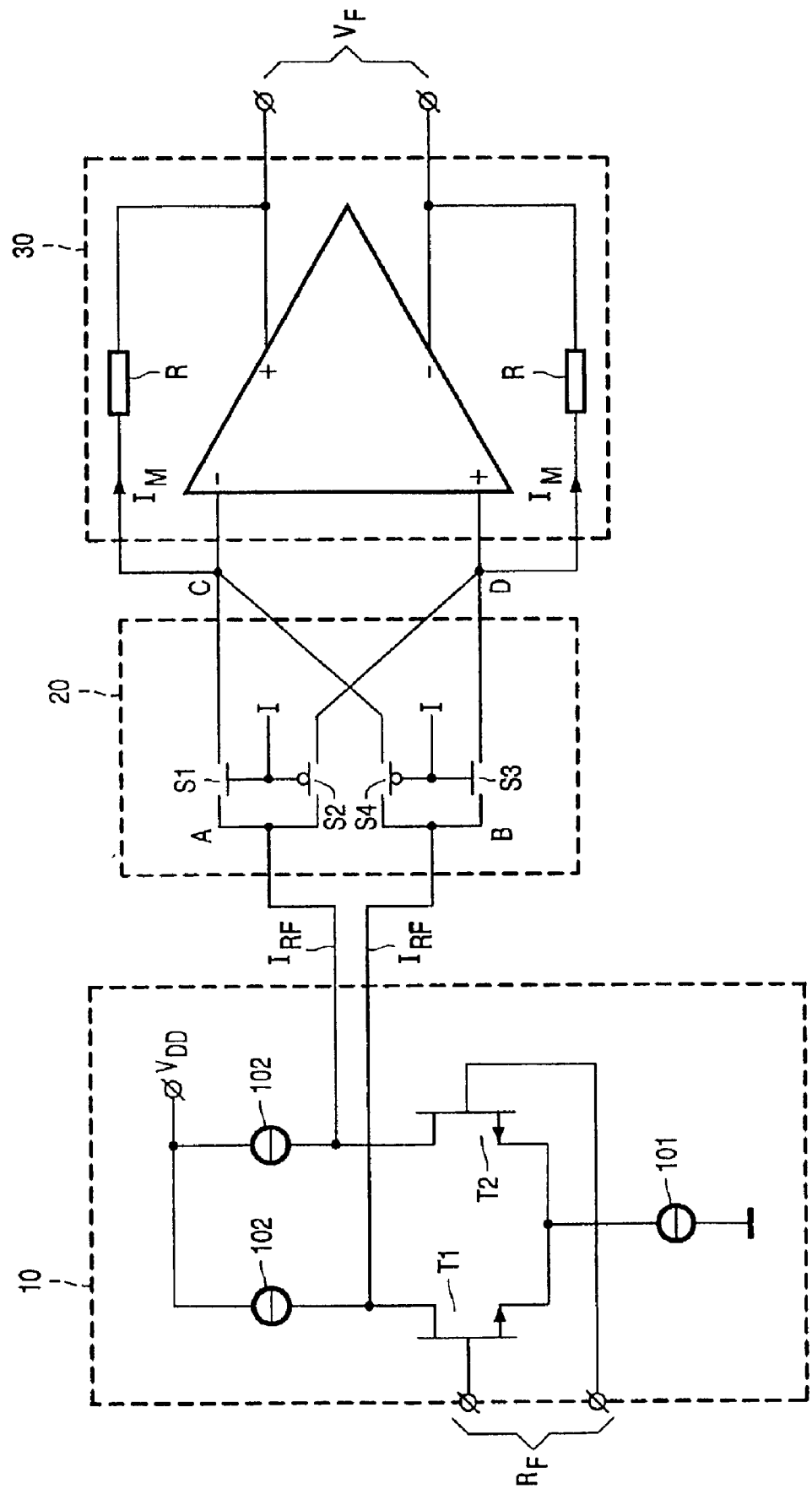

The above and other features and advantages of the invention will be apparent from the following description of the exemplary embodiments of the invention with reference to the accompanying drawings, in which:

FIG. 1 depicts a block diagram of a receiver according to the present invention, FIG. 2 depicts an embodiment of a part of a receiver in more detail according to the invention, FIG. 3 depicts an embodiment of a mixer realized with CMOS transistors according to the invention.

FIG. 1 depicts a block diagram of a receiver 1 according to the invention. The receiver comprises a voltage to current converter 10 that receives a first signal RF and generates a second signal $I_{RF}$ that is a current and, said current is indicative for the first signal RF. The second signal $I_{RF}$ is inputted into a mixer 20. The mixer 20 combines the second signal $I_{RF}$ with a periodical signal LO generated by a local oscillator 25. The mixer 20 generates a third signal $I_M$. Considering that the first signal RF has a first frequency and the periodical signal LO has a second frequency then the third signal $I_M$ is indicative for a difference between the first frequency and the second frequency. Preferably the difference between the first frequency and the second frequency approaches zero, i.e. the receiver 1 is a Zero-IF receiver. In order to reduce the power consumption of the receiver 1, the mixer comprises a plurality of controllable passive switches. In an embodiment of the invention the controllable switches are CMOS transistors. The third signal $I_M$ is inputted in a variable gain current to voltage converter (VGIV) 30, said VGIV 30 being conceived to generate a first voltage signal $V_F$. The VGIV 30 has a parameter indicative for a ratio between the first voltage signal $V_F$ and the third signal $I_M$. Usually the parameter is expressed as the ratio of $V_F$ and $I_M$ representing, in this case, a transimpedance. The VGIV 30 converts and amplifies the third signal $I_M$. Because the third signal $I_M$ is a relatively low frequency signal the amplification is easier to be obtained.

The first voltage signal $V_F$ generated by the VGIV 30 is further low-pass filtered in a first filter 40 in order to reduce high frequency parasitic components comprised in the first voltage signal $V_F$. In order to maintain power consumption at a low level, the first filter 40 is a passive one. When power consumption is not critical the first filter could be also an active filter. In other applications the first filter 40 could be a capacitor that could be integrated on the same chip with the VGIV 30. The first filter 40 generates a second voltage signal VF1 that is inputted into an amplifier means 50. The amplifier means 50 generates a third voltage signal $V_{F2}$ that is inputted into a second filter 60, said second filter 60 removing adjacent channels and image frequencies comprised in the first voltage signal $V_F$. In order to maintain low power consumption, the second filter 60 is also passive but depending on the application it could be active, i.e. in applications where power consumption is not an important parameter. A signal generated by the second filter 60 which is a fourth voltage signal $V_{F3}$ is inputted into an analog to digital converter 70 for obtaining a binary signal that is demodulated in a detector 80. The detector 80 is coupled to the analog to digital converter 70 and generates a demodulated signal $V_D$ and a control signal $V_C$. The amplifier means 50 compensates losses in the first filter 40 and in the second filter 60 and, furthermore it is controlled by the control signal $V_C$ generated by the demodulator in order to maintain a significantly constant level of the demodulated signal $V_D$. It is further observed that using Zero-IF, the analog to digital converter 70 can comply with a bandwidth that is substantially half of the bandwidth required when Low-IF is used.

FIG. 2 depicts an embodiment of a part of a receiver 1 in more detail according to the invention. The voltage to current converter 10 comprises a pair of transistors T1, T2 having their source terminals coupled to each other. The pair of transistors is further coupled to a first current source 101 for biasing and they have as loads a second current source 102 in their drains. The first signal RF is considered to be differential but a skilled person in the art could easily derive a schematic suitable for using unipolar or single ended signals. The voltage to current converter 10 has a relatively high input impedance determined by the first current source 101 and provides at it's outputs i.e. in the drains of the transistors T1 and T2 a second signal $I_{RF}$ which is a differential current. The second signal $I_{RF}$ is inputted to a mixer 20 that is coupled to a variable gain voltage to current converter (VGIV) 30. The mixer 20 comprises a plurality of controllable switches S1, S2, S3, S4 coupling periodically the node A to nodes C or D and node B to nodes C or D.

In the embodiment shown in FIG. 2 it is considered that the local oscillator generates a periodical signal having two components that are in quadrature to each other, i.e. Q and I. Furthermore, in FIG. 2 only the I path is shown, the Q path being substantially identical to the I path. When I component has it's highest level it controls the switches S1 and S3 in a conducting state and when it has it's lowest level it controls the switches S2 and S4 in a conducted state suggested by small circles attached to control terminals of the switches S2 and S4. When the control signal i.e. I, has it's highest level, the switch S1 couples the node A to the node C and the switch S3 couples the node B to the node D. When the control signal i.e. I has it's lowest level, the switch S2 couples the node A to node D and the switch S4 couples the node B to node C. The frequency of the I component is substantially equal to the frequency of the first signal RF resulting a Zero-IF receiver. The third signal $I_M$ transmitted by the mixer 20 is inputted to the VGIV 30. The VGIV 30 has a relatively high input impedance, much higher than that of a controlled resistor R. The VGIV 30 generates a first voltage signal $V_F$ signal that is proportional to a product of R and $I_M$. As a direct consequence, the first voltage signal $(I_M)$ could be controlled by controlling the resistor R. The resistors R could be controllable in several ways either by electrical signal i.e. a voltage signal or a current signal or by non-electrical signals as temperature signals or light signals.

The controllable switches could be CMOS transistors as it is shown in FIG. 3. In FIG. 3 transistors $M_I$, I=1,2,3,4 correspond to $S_I$, I=1,2,3,4 in FIG. 2. Furthermore the signal I corresponds to the highest level of the signal I and $\bar{I}$ is the inverse signal I such that whenever the signal I has it's highest level the signal $\bar{I}$ has it's lowest level. Otherwise the circuit in FIG. 3 works in a similar fashion as the circuit in FIG. 2 does.

It should be remarked that the controllable switches could be also bipolar transistors or passive switches. Furthermore the resistors R could be CMOS transistors that could be controlled either by a voltage or a current, a thermistor that is controlled by temperature a photo-controlled device e.g. photo-transistor controlled by light.

It is remarked that the scope of protection of the invention is not restricted to the embodiments described herein. Neither is the scope of protection of the invention restricted by the reference numerals in the claims. The word 'comprising' does not exclude other parts than those mentioned in a claim. The word 'a(n)' preceding an element does not exclude a plurality of those elements. Means forming part of the invention may both be implemented in the form of dedicated hardware or in the form of a programmed general-purpose processor. The invention resides in each new feature or combination of features.

What is claimed is:

1. A receiver (1) comprising an input for receiving a first signal (RF), said receiver further comprising a local oscillator (25) for generating a periodical signal (LO), the receiver (1) further comprises a mixer (20) for generating a third signal ($I_M$) representative for a combination of a second signal ($I_{RF}$) and the periodical signal (LO), said receiver (1) being characterized in that the receiver (1) further comprises a voltage to current converter (10) for receiving the first signal (RF) and generating the second signal ($I_{RF}$) as a current indicative for the first signal (RF), the mixer (20) comprises a plurality of controllable switches, the receiver (1) farther comprises a variable gain current to voltage converter (VGIV) (30) coupled to the mixer (20), the VGIV (30) receiving the third signal ($I_M$) and generating a first voltage signal ($V_F$), said first voltage signal being in a linear relationship with the third signal ($I_M$).

2. A receiver (1) as claimed in claim 1 wherein the voltage to current converter (10) is a transconductance amplifier.

3. A receiver (1) as claimed in claim 1 wherein the first signal is a differential signal.

4. A receiver (1) as claimed in claim 1 wherein the third signal ($I_M$) is a zero-IF signal.

5. A receiver (1) as claimed in claim 1 wherein die periodical signal (LO) comprises a first component (I) and a second component (Q), the first component (I) being in quadrature with respect to the second component (Q).

6. A receiver (1) as claimed in claim 1 wherein the plurality of controllable switches, comprises CMOS transistors.

7. A receiver (1) as claimed in claim 1 wherein the VGIV (30) is coupled to a first filter (40), the first filter (40) being arranged to generate a second voltage signal ($V_{F1}$), said second voltage signal ($V_{F1}$) having a reduced magnitude of a set of parasitic components in comparison to that comprised in the first voltage signal ($V_F$).

8. A receiver (1) as claimed in claim 7 wherein die first filter (40) is coupled to an amplifier means (50), said amplifier means (50) being further coupled to a second filter (60), the amplifier means (50) being conceived to generate a third voltage signal ($V_{F2}$), the second filter (60) being arranged to generate a fourth signal (VF3), said fourth signal ($V_{F3}$) having a reduced magnitude of a second set of parasitic component in comparison to the second voltage signal ($V_{F1}$), said amplifier means (60) being conceived to amplify the second voltage ($V_{F1}$) for compensating a loss in the second filter (60).

9. A receiver (1) as claimed in claim 1 wherein the second filter (60) is coupled to an analog to digital converter (ADC) (70), said ADC converting the fourth signal ($V_{F3}$) received from the second filter into a binary signal to be transmitted to a detector (80).

10. A receiver (1) as claimed in claim 9 wherein the detector (80) generates a control signal ($V_C$) for controlling an amplification of the amplifier means (50).

* * * * *